United States Patent [19]

Cotillier, Sr.

[11] Patent Number: 4,850,128
[45] Date of Patent: Jul. 25, 1989

[54] AERIAL FISH PROBE

[76] Inventor: James C. Cotillier, Sr., 334 W. Woodbury Rd., Altadena, Calif. 91001

[21] Appl. No.: 117,569

[22] Filed: Nov. 6, 1987

[51] Int. Cl.$^4$ .............................................. A01K 97/00
[52] U.S. Cl. ............................................ 43/4; 43/17; 116/210; 116/211
[58] Field of Search ............... 43/4, 4.5, 16, 17, 43.12, 43/44.87; 116/210, 211

[56] References Cited

U.S. PATENT DOCUMENTS

| | | | |
|---|---|---|---|
| 3,676,779 | 7/1972 | Faulring | 116/210 |
| 3,735,723 | 5/1973 | Lutz | 116/210 |
| 3,746,285 | 7/1973 | Mango | 116/210 |
| 3,881,531 | 5/1975 | Rossi | 116/210 |
| 3,941,079 | 3/1976 | McNeill | 116/210 |
| 4,596,085 | 6/1986 | Cotillier | 43/17 |
| 4,639,744 | 3/1987 | Cotillier | 73/170 A |

Primary Examiner—Gene P. Crosby

[57] ABSTRACT

Two half sections of bamboo defining three chambers contain a pre-inflated helium gas balloon with a radio beacon, two bags of surface dye, and bait fish. The sections are secured together by multiple wrappings of line ending in hooks or lures. When the associated probe is deployed, the windings unravel in free-fall—separating the half sections and dispersing the bait. The balloon is released and descends to the water surface, where the line hooks and the bait submerge. An aquatic nibble causes the balloon to bob. A more forceful bite separates the bags of dye—creating a surface marker. If a hook is set, the line also extracts a pin from the balloon—activating the radio beacon and freeing it to rise to an altitude where an induced leak soon results in the balloon redescending to the surface of the water. Upon reaching the surface, normal wave propagation forces out the residual gas and the balloon, being no longer buoyant under the weight of the radio beacon, sinks to the ocean bottom. Aircraft flying in various flight line patterns and deploying a given number of devices at intervals can obtain an accurate estimate of the presence of fish in any sized area. A small sinker may be added to the line to facilitate the unwinding of the device as it floats on the surface of the water. If no fish bite, the device floats until recovered for reuse.

20 Claims, 2 Drawing Sheets

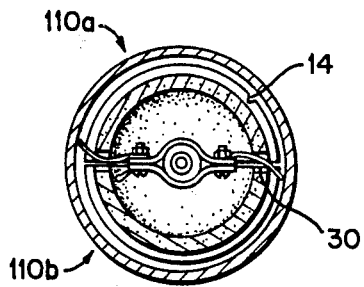
FIG. 3
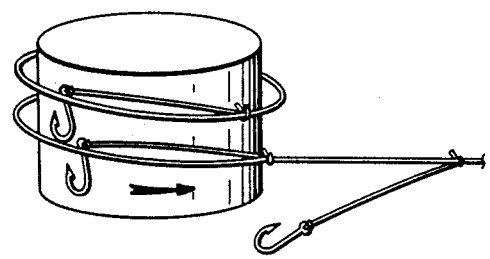
FIG. 4
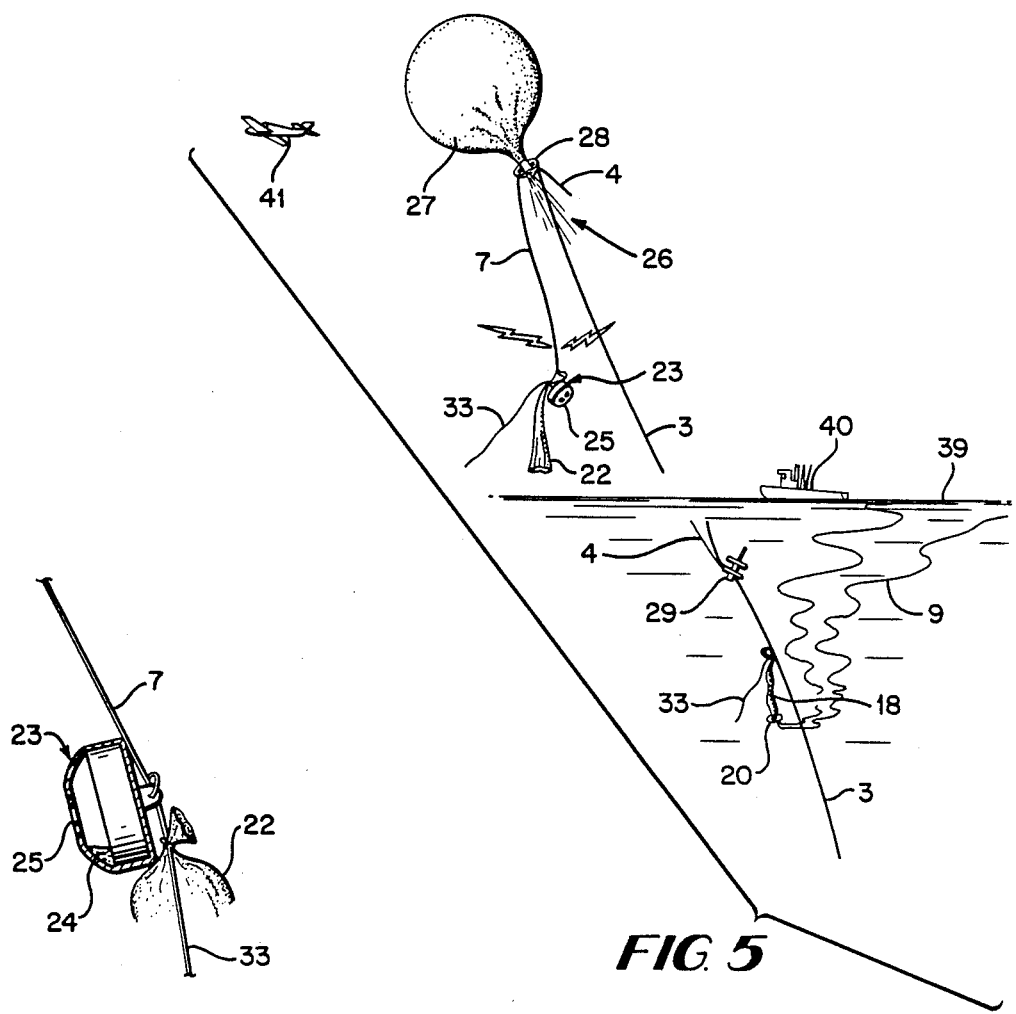
FIG. 5
FIG. 5a

AERIAL FISH PROBE

CROSS-REFERENCES TO RELATED APPLICATIONS

This application is related to my copending commonly-assigned U.S. application Ser. No. 042,034 of Cotillier entitled "Fish Chumming Device" filed Apr. 24, 1987, now abandoned.

FIELD OF THE INVENTION

The invention pertains to fishing, and more particularly to methods and apparatus for detecting fish for fish taking and conservational purposes.

BACKGROUND OF THE INVENTION

There has always existed within the fishing industry a need to determine the presence (or absence) of fish over a wide area of fishing grounds in a rapid and expeditious manner. Such determination would allow fishing boats to proceed directly to areas having the highest potential for catch. Presently, the time consuming practice of searching small areas one at a time on a trial and error basis is relied upon to locate fish. Schools of fish can move from an unsearched position to a location that has already been fished—giving the false impression that no fish are present at the moment.

Some of these problems are solved by the devices described in my U.S. Pat. No. 4,596,085 issued June 24, 1986 and in my U.S. Pat. No. 4,649,744 issued Mar. 17, 1987. However, further improvements are possible.

SUMMARY OF THE INVENTION

This invention and new technique now makes it possible for fishermen to quickly locate higher yield fishing spots on an extremely cost effective basis.

Another satisfying and advantageous feature of my invention is to provide boundary markers and fishing line buoys, precluding the necessity of having to obtain and lay additional gear.

In the field of conservation and stock assessment the difficulty has always been the inability to obtain an accurate estimate of fish presence due to the near impossibility of covering large fishing grounds at one point in time. Now, with the small inexpensive devices provided by my invention combined with the speed of aircraft, a far more accurate assessment of fish presence is realized at a substantial saving in time and effort.

A preferred embodiment of my invention includes two loosely fitted split sections of bamboo which define three chambers therein. The chambers contain a pre-inflated helium balloon fastened to which is a radio beacon; two bags of surface dye; a line reel; and chum bait pieces. The split sections are secured together by multiple wrappings of line ending in baited hooks or lures. The body so secured is deployed from an aircraft over the fishing grounds (several such bodies may be deployed in predetermined flight patterns).

Upon release of the body from the plane, the line unwinds in free-fall, scattering the chum until the body contacts the water surface. Being buoyant, the body floats while the line continues to unravel underwater, thus releasing the hooks. When insufficient line remains to contain the compressed balloon within the bamboo halves (which separate under the balloon pressure and are jettisoned into the sea), the line then terminates at the dye bags. The device (now minus the bamboo body) continues to drift free until fish are encountered.

If a fish takes a hook, but throws it, the balloon may be observed bobbing on the surface. If the hook is set, the bags of dye separate and dye colors the water surface. If more than one fish bites, the increased tension of the line causes the balloon to rise from the water surface into the air and also activates the radio beacon. If a multitude of fish (e.g., a school) strike, and balloon descends below and returns to the surface under still higher tension and the balloon line breaks, resulting in the extraction of a pin from the balloon and freeing the balloon and radio beacon. The freed balloon and beacon rise to an altitude where the radio signal is capable of being received at a far greater distance over the horizon. The dye bag, being attached to the now free line, bleeds a high visibility coloring into the water surface as an indication of the direction the school is moving (the width and degree of dissolution of the entrailing streak possibly providing an estimation of depth to the trained observer).

The extraction of the pin, now in the free balloon, initiates a predetermined rate of leakage of the helium gas resulting in a fairly rapid descending trajectory to the surface of the water where it may be promptly recovered for reuse or left to float until the residual gas is insufficient to support the device (at which time the device sinks to the bottom).

A plurality of such devices, linearly disposed, provides immediate perspective of fish dispersion.

The present invention thus provides a rapid and low cost way to ascertain the presence of fish or other bait-taking aquatic creatures from the surface of the water on a one-time expendable basis.

In somewhate more detail, the presently preferred exemplary embodiment is deployed above the surface of the water and sinks below the surface. The presently preferred exemplary embodiment is provided with sensing devices that sense the presence of fish in the water. If the presence of fish is sensed, the sensing device colors the water in the vicinity of the presently preferred exemplary embodiment to provide a visual indication that fish are present in the water. In addition, the device will further indicate the presence of fish in the water by (a) bobbing up and down on the surface of the water, (b) rising a fixed distance above the surface of the water, and/or (c) rising from the water and ascending into the atmosphere—in response to different levels of fish stimulus. The presently preferred exemplary embodiment may also predispose chum to attract fish.

The sensing device preferably includes a hook for hooking the fish and may further include bait for attracting fish to the hook. The sensing device may also include an artificial lure and a hook which hooks the fish. The sensing device causes the balloon of the presently preferred exemplary embodiment to bob upon the surface of the water in response to the presence of fish in the water. The sensing device causes the presently preferred exemplary embodiment to release a high visibility coloring dye into the water which may rise to the surface. Further, the sensing device then causes the presently preferred exemplary embodiment to ascend a predetermined distance above the surface of the water and from that point, further ascend to a predetermined altitude above the surface of the water and, still further, may thereafter descend from an altitude above the surface of the water.

The presently preferred exemplary embodiment may be visually observed upon the surface of the water and while suspended in the atmosphere. The sensing device may also include a radio frequency homing beacon that emits an electronic signal that may be receivable in the atmosphere or on the surface of the water and may include a means for activating the radio beacon including a means for predetermining the distance the device is suspended above the surface. The device may include a means for selecting a height to which the presently preferred exemplary embodiment ascends and also a means to determine the direction of motion of the hooked fish.

The presently preferred exemplary embodiment defines a split tubular shaped multi-chambered housing with end cavities being wound over with fishing line and hooks covered by tissue. An end cavity contains a reel of such line, and an opposite end cavity contains covered fish bait. An internal chamber restricts an inflated balloon, with an adjacent chamber enclosing bags of water coloring, tied to a radio beacon and attached together by fish lines of varying tensile strengths.

The small force exerted on a line, as would be by a single hooked fish, results in the bobbing of the device on the surface which may be observed as an indication of the presence of fish.

Increased tension on a line, as would be caused by several hooked fish, results in the separation of the bags of dye coloring by the parting of a relatively weaker interconnected line resulting in the coloring of the surface water as an indication of a plurality of fish.

An increased tension on a line, as would be caused by a multitude of fish, results in the extraction from the end reel of relatively heavier line by the parting of another interconnected relatively weaker line, permitting the balloon to rise above the water surface to a height limited by the length of the reeled line. The risen balloon may be observed as an indication of a multitude of fish.

An even higher tension on the line results in the extraction of a pin within the balloon making the balloon entirely free to rise to an atmospheric pressure height—where the radio beacon transmissions may be received over the greatest distance of the horizon as an audible indication of the presence of a school of fish on a radio receiver when the device is out of sighting distance. The extraction of the pin from the balloon results in a slow leakage of gas from the pinhole (the point of leakage being selectable by the tightness of the sealing clamp screws). This leakage causes the balloon to promptly begin a slow descending trajectory toward the surface where it may be retrieved for reuse or where it will drift until the gas has been expended to the point where there is insufficient buoyancy and the device sinks to the bottom.

My invention provides an excellent method to obtain fish data below the surface at an extremely low cost in materials and labor. Deploying the devices in multiple patterns by air produces fish saturation pictures for large areas far more rapidly and with less effort than before possible. Further, since the degree of tension on the fish line is an actual determination of the quantity present, the most sought after large schools can be located.

Assembly of the devices may be done by just about anyone who has wound a fishing reel. The cost of obtaining materials in some tropical areas where bamboo is bountiful is negligible. The costs may be further reduced by substituting red terra-cotta clay finely ground and used as a pigment in light weight fish oil or equivalent as a surface dye in place of coloring material.

The device may be used effectively far beyond the horizon due to the high altitude feature and the line-of-sight characteristics of very high frequency radio transmission. The rapid ascent and descent feature minimizes the possibility of a receiver receiving simultaneous transmissions from more than one device. The balloon may be easily observed both horizontally from the surface and vertically from the air. Also from the air, an indication of the depth of the fish is assessable by the width and dissolution of the dye as well as the direction of movement by the entrailing dye streak. The near immediate ejection of the chum from altitude upon deployment of the device provides the widest dispersion over the sea surface. The outer tissue covering prevents loosening or loss of bait from the hooks during free fall. The sequential winding of the hooks where no leader extends beyond the tie point of the succeeding hook minimizes entanglement. The end winding requires a period of time to unwind, preventing the hooks from unwinding before the device is well clear of aircraft, boat or hands. The through holes in the chum cavity create an air flow to more rapidly force out the bait at the highest altitude for maximum saturation of the surface. The swinging radio beacon mercury switch alternately makes and breaks the circuit—extending the button battery life significantly. The presence of the balloons on the surface alert other boats of fishing in the area without the necessity of deploying additional markers.

The frugal cost of the device permits it to be expendable, eliminating the labor for recovery as is required by more costly instruments. The compact design allows a maximum number of units to be carried in the plane or other vehicle.

A good safety feature is that the pin cannot be removed without taking off all of the line as the line angles downward from the pin to the beginning of the winding. Another safety feature is the hard rubber stopper transferring the compression load uniformly throughout the end web area, so that the entire web must fail before the balloon can escape accidentally. There are no pyrotechnics or explosives involved such as with porpoise bombs.

The progressively increasing breaking strengths of the various lines constitutes a simple means of programming successive events. The free radio beacon at high altitude signifying a school of fish is most desirable as the greater emission range alerts the most boats for the maximum yield. The radio beacon cannot accidentally activate for any length of time unless the tension has been removed from the bottom line in order for it to rotate to the position where the mercury covers the two circuit contacts.

External placement of the exposed hooks makes it easy to change bait prior to use. A portion of the culm body extending past the web holding the inflation pin and stopper acts as a protective guard against abuse. The holes and slots in the end chum cavity permit inspection for any rancidity. The eventual rising of the hooked fish and line to the surface for recovery is an additional bonus.

BRIEF DESCRIPTION OF THE DRAWINGS

These and other features and advantages of the present invention will be better and more completely understood by referring to the following detailed description of presently preferred exemplary embodiments in conjunction with the appended sheets of drawings, of which:

FIG. 3 is a cross-sectional end view of the embodiment shown in FIG. 1;

FIG. 4 is a detailed schematic view of the hook and leader line winding shown in FIG. 2;

FIG. 5 is a schematic view of deployment of the FIG. 1 embodiment; and

FIG. 5A is a detailed schematic diagram of the radio beacon of the FIG. 1 embodiment in the nontransmitting mode.

DETAILED DESCRIPTION OF PRESENTLY PREFERRED EXEMPLARY EMBODIMENTS

Figure 1:
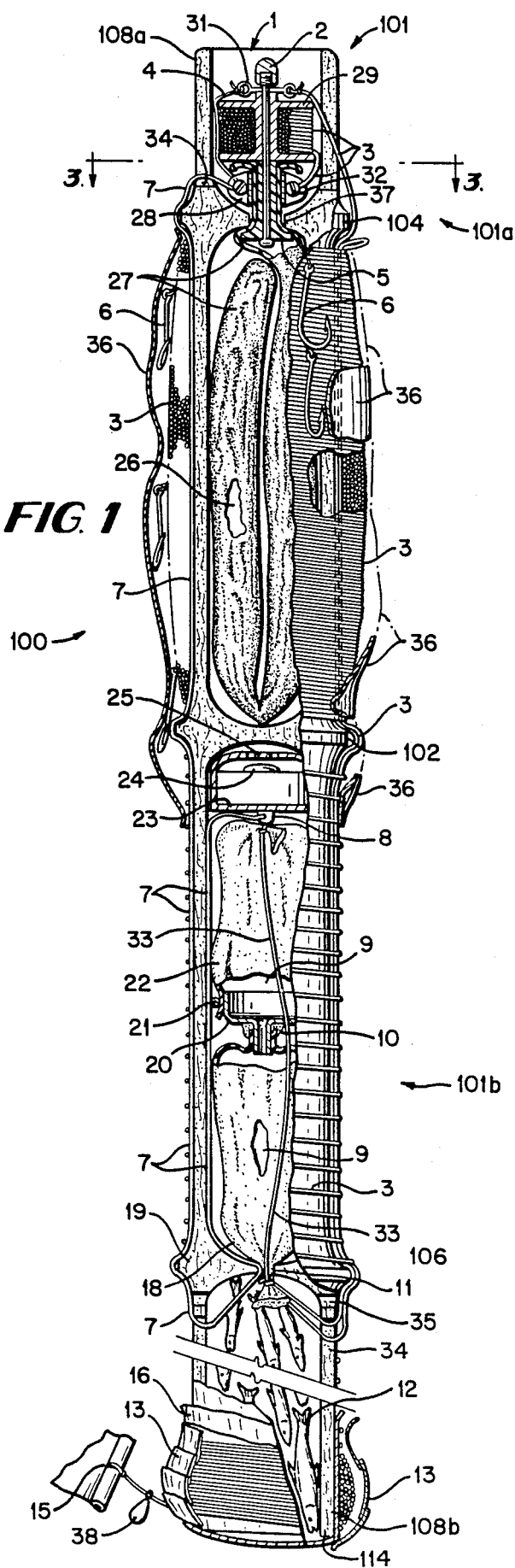
FIG. 1 is a partial cross-sectional elevational plan view of the fully assembled presently preferred exemplary embodiment of the present invention.

FIG. 1 shows a presently preferred exemplary embodiment of an aerial fish probe 100 in accordance with the present invention. The preferred embodiment of fish probe 100 includes a body 101 made of bamboo reeding (Bambusa genus) or material of similar characteristic properties a cross-section of which is cut from a culm 1 so as to have a complete (upper) section 101a between scarf nodes 102 and 104 and another complete (lower) section 101b between scarf nodes 102 and 106—with small extended portions 108a, 108b extending beyond the nodes 104, 106 respectively on each end (see FIG. 1).

A few holes are evenly drilled around the open end of culm 1 nearer the upper node 104 and a center hole 11 is drilled through the web within the culm 1. The culm lower end 101b has a drilled hole 35 perpendicular to the culm axis which is slightly larger in size. The culm 1 is split down the exact center, forming two mating halves 110a, 110b. A slight amount of material 34 is removed from both ends of the interfacing edges 30 between the culm 1 halves 110a, 110b (as shown in FIG. 3) so that the matching halves fit loosely together.

A balloon assembly 27 is placed into the open face half portion 110a of culm 1, as is a stopper 5, clamp 28 (with retaining nuts and screws 32), reel 29 carrying wound line 3, 4, needle fill valve 2 with washer 31 (the needle valve passing through the center of reel 29 in the preferred embodiment), and a flexible radio frequency transmitting antenna 7 (which in the preferred embodiment may be considered a conductive portion of line 3). A radio beacon 23 is placed into the lower portion of culm 1 with a conventional mercury switch contact 25 being electrically and mechanically connected at eye 8 to antenna 7. Antenna 7 and line 33 (a further length of line) are tied to dye bag 22 containing high visibility surface coloring 9 and secured to cup 20 by "O" ring 21. Cup 20 is, in turn, adhered to the neck 22a of bag 22 along with high visibility surface coloring 9, and is tied off on the far side of web hole 11 by line 3 (doubling back) and by line 33 tied with antenna 7 exiting.

Once half of culm 1 is loaded with the components described above, the other half section of culm 1 is placed over the assembly and secured to the half exactly in the original shape of culm 1. Antenna 7 is trimmed (resonated) to the proper radio frequency and connected to clamp nut 32.

The resulting structure comprises a plurality of separate and discrete components which are connected together by various segments of line having different tensile strengths.

Figure 2:
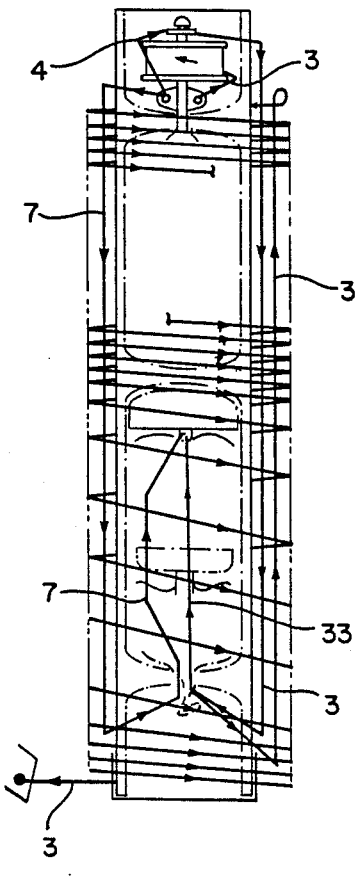
FIG. 2 is a schematic diagram of the FIG. 1 embodiment showing the outer leader line winding.
Figure 1A:
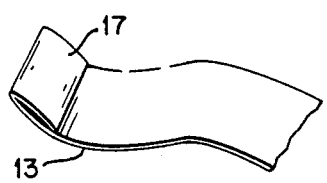

One end of line 3 is tied to clamp nut 32, and line 3 is wound around reel 29. Line 3 exits body 101 at body top end portion 108a, where it is tied to a washer 31 disposed around needle valve 2 in the preferred embodiment. A further short section of line 4 having a relatively low tensile strength is tied between washer 31 and clamp screws 32, this short line section preventing line 3 from unwinding from reel 29. From washer 31, line 3 exits body 101 and runs to the opposite body end 108b, enters the body through hole 34, and is tied to further line section 33. Further line section 33 having a smaller tensile strength than that of line 3 connects dye bags 18, 22 together and ties line 3 to the dye bags. From dye bags 18, 22, and line 33, line 3 then exits the body 101 once again, reverses and winds downward over the outer surface of the body (as shown in schematic FIG. 2) under tension. Wound line 3 rigidly retains the assemblies and two body parts in place, and is also connected to evenly spaced leaders and hooks 6 coveringaerial 7. Aerial (antenna) 7 is connected at one end to clamp screws 32, exits body 101 and runs along the outside of the body to hole 35, enters the body and is securely fastened to the necks of dye bags 22). The windings of line 3 are closely spaced from end 108a to about halfway down body 101 (e.g., at center node 102) where the spacing is increased somewhat to nearly the open end 108b of culm 1.

Chum 12 is inserted into the body cavity 114 just within end 108b and covered over with a cavity cover 16 (e.g., a sheet of light plastic) wound over by line 3 (see FIG. 4). The windings of line 3 at end 108b are covered by adhesive tape strip 13 (the line end 15 being tied to the tape). A small piece of tape 13 is doubled back to act as a pull tab 17. Baiting hooks 6, inflating balloon 27 with helium 26 (through needle valve 2), and covering baited hooks 6 with a few turns of wetted toilet paper 36 (or similar material) which has been hot air dried completes the assembly and makes probe 100 ready for use.

Small nicks 14 (see FIG. 3) may be cut into the ridges of nodes 102, 104, 106 to facilitate winding of line 3 by acting as retaining guides. A sinker 38 may be attached to line 3 (see FIG. 1) to hasten the unwinding of the line underwater when deployed from boats 40 (as shown in FIG. 5).

The presently preferred exemplary embodiment is deployed from an aircraft 41 (FIG. 5) or boat 40 by pulling tab 17 of adhesive tape 13 free and tossing the probe 100 into the air.

As soon as probe 100 is released, line 3 begins to unwind (FIG. 1) in free-fall by the slipstream of air. At this point, the windings of line 3 near body end portion 108b spin off and cavity cover 16—acting under the force of air pressure entering the chamber—unseals the open end 108b to allow rapid ejection of chum 12 free-falling over the widest area of the surface of the water 20 (as shown in FIG. 5).

While probe 100 falls through the air, however, tissue 36 prevents or slows further unwinding of line 3. Outer tissue 36 (FIG. 1) becomes wetted and begins to decompose when probe 100 descends below the water surface, promptly allowing line 3 to more readily continue to unwind (FIG. 5). Each baited hook 6 (FIG. 1) is then free to fall away in sequence under the water (the hooks being attached at intervals of length along the line).

As line 3 unwinds past a certain point on culm 1, the internal pressure of helium gas 26 in balloon 27 erupts balloon 27—outwardly flinging the two split half sections 110a, 110b of culm 1 into the water. The device then assumes the position on the surface of the water where the wind and wave motion of the water pulls line 3 downwind, causing a life-like motion to the under water baited hooks 6 and alerting other boats of fishing in the area.

If the device is deployed by surface vessel, adding sinker 38 to line 3 makes the unwinding of line 3 more rapid because probe 100 is buoyant as assembled and floats on the surface of water 20 (FIG. 5). The chum 12 then disperses more slowly and becomes concentrated into a very small envelope which may be desirable for deep water fishing.

If no reaction at all occurs while probe 100 is on the surface of the water, it may be assumed that there are no fish present at that moment in the area.

A fish nibbling at baited hook 6 but applying only little tension on line 3 causes balloon 27 to bob on the surface of the water—indicating the presence of small fish in the area.

If a fish takes the hook 6 on line 3, exerting small but sufficient tension to break line 33 and another fish also takes hook 6, the combined force will be sufficient to separate dye bags 18, 22—causing dye bag 22 (containing high visibility surface coloring 9) to appear on the surface of the water and also causing line 3 to directly connect to clamp washer 31. This interaction signifies that a plurality of fish are present in the area.

If a multitude of fish take many hooks 6 and the tension on line 3 results in the breakage of line 4, further line 3 unwinds from reel 29 and balloon 27 is free to ascend from the surface of the water to a height corresponding to the length of line wound on reel 29. Ascension of balloon 27 thus indicates that a substantial number of fish are present in the area.

When most of hooks 6 are taken, as would occur with a large school of fish, the sudden force on hooks 6 is such that pin 2 is jerked from stopper 5, balloon 27 is then free to rise into the atmosphere. Radio beacon 23 falls into a horizontal activated position 23 whenever balloon 27 rises (because of loss of tension on line 33) and begins emitting an RF signal. This signal alerts the maximum number of boats (some boats possibly being positioned out of sight of the device) of the presence of a school of fish for highest combined yield in the area.

If the presently preferred exemplary embodiment is in an area where a large number of fish remove pin 2, breaking dye bag 22, dye bag 18 will commence metering into the water (through cup 20) high visibility surface coloring 9, at a constant rate, indicating the direction the school of fish (still attached to line 3) are travelling. After line 3 is pulled, the cup 20 (secured by "O" ring 21) is opened into the water. This entailing streak cup 20 may be observed from the surface of the water 39 (FIG. 5).

Helium gas 26 (FIG. 1) in balloon 27 carries balloon 27 aloft to an equilibrium pressure altitude that is determined by the amount of inflation to balloon 27 at the time of assembly. However, extracting pin 2 from stopper 5 results in a predetermined rate of leakage of helium gas 26 due to the material of stopper 5 and desired tightness of screws and nuts 32 of clamp 28. Thus, upon reaching maximum altitude, balloon 27, while still carrying radio beacon 23 suspended on antenna 7, emits a signal and promptly begins to descend in a downward trajectory (resulting from the diminishing helium displacement). Balloon 27 finally contacts the surface of the water 39 and floats until it is recovered by boat 40 (or until the residual helium gas 26 dissipates and can no longer sustain the weight of radio beacon 23 on the surface and then sinks to the bottom). Line 3, being carried underwater by fish on taken hooks 6, eventually rises to the surface of the water 39 where the fish may be subsequently recovered if desired.

If recovered, the presently preferred exemplary embodiment may be reused by assembling the split half sections of culm 1, rebaiting hooks 6 and reinflating balloon 27 with helium gas 26 and rewinding line 3.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A probe for detecting the presence of fish comprising:
   a body having separate first and second concave shell portions connectable together to enclose a cavity therein, said body shell portions each having an outer surface;
   an inflatable balloon disposed within said cavity;
   a first filament portion wound around said body shell portion outer surfaces so as to join said first and second shell portions together, said first filament portion connected at one end thereof to said balloon;
   at least one hook connected to said first filament portion; and
   a flexible container of dye disposed within said cavity and also connected to said first filament portion.

2. A probe as in claim 1 wherein said balloon is filled with a gas which is less dense than air.

3. A probe as in claim 1 wherein:
   said first filament portion is partly made of an electrically conductive material; and
   said probe further includes radio transmitting means for producing a radio frequency signal, said probe being electrically connected to said filament conductive portion, said filament conductive portion comprising means for radiating said radio frequency signal.

4. A probe as in claim 3 wherein said radio transmitting means includes electrical switch means for selectively activating said transmitting means in response to the orientation of said transmitting means.

5. A probe as in claim 4 wherein said switch means includes first and second electrical contacts and a quantity of mercury, said mercury selectively making and breaking electrical contact between said electrical contacts.

6. A probe as in claim 1 wherein said body shells comprise halves of a bamboo culm cut lengthwise.

7. A probe as in claim 1 wherein:
   said balloon has a neck; and
   said probe further includes:
   a stopper disposed within said balloon neck, said stopper having an aperture defined therethrough, and a pin disposed through said stopper aperture and connected to filament portion.

8. A probe as in claim 1 wherein:
an end of said body defines an opening;
bait is disposed within said body cavity at said opening; and
said probe further includes covering means, disposed over said opening, for retaining said bait within said cavity while said filament portion is wound around the outside of said body and for allowing said bait to escape from said cavity when said filament portion is unwound from around said body.

9. A fishing probe comprising:
a body having first and second shell portions connectable together to enclosed plural cavities therein, said shell portions defining an opening into a first of said plural cavities, said body shell portions each having an outer surface;
a filament wound around said body shell portion outer surface so as to join said first and second shell portions together;
at least one hook connected to said filament;
a flexible cover disposed over said shell portion opening and retained by said wound filament;
a reel disposed within a second of said plural cavities;
a further filament wound onto said reel;
a still further filament operatively coupled to said reel so as to selectively prevent said further filament from unwinding from said reel;
a balloon disposed within said second cavity, said balloon having a neck;
a stopper disposed in said balloon neck, said stopper defining an aperture therein;
a pin disposed in said stopper aperture and coupling said reel to said stopper, said pin being operatively connected to said first-mentioned filament, said pin being extractable from said stopper in response to sufficient force exerted on said hook;
a radio transmitting means for producing radio frequency signals;
conductive filament means connected between said radio transmitting means and said balloon stopper for connecting said transmitting means to said balloon and for radiating said radio frequency signals, and
at least one bag adapted for containing a water colorant connected to said first-mentioned filament, said bag including a neck; and
cup means disposed in said bag neck for metering the escape of said water colorant from said bag through said neck.

10. A probe as in claim 9 wherein said radio transmitting means includes switching means for selectively activating said radio transmitting means in response to orientation thereof.

11. A probe as in claim 9 wherein said first-mentioned, further and still further filaments have different tensile strengths.

12. A probe as in claim 9 including plural hooks connected to and spaced at intervals along said first-mentioned filament.

13. A probe as in claim 9 further including chum disposed in said first cavity and retained therein by said cover.

14. A probe as in claim 9 further including means disposed over said wound first-mentioned filament for inhibiting said first-mentioned filament from unwinding until said probe descends below the water surface.

15. A probe as in claim 9 wherein said body sections comprise halves of a bamboo culm.

16. A probe as in claim 9 further including needle valve means, disposed on said pin, for permitting said balloon to be filled with gas.

17. A probe as in claim 9 wherein said balloon is adapted for containing a gas lighter than air.

18. A method of locating fish comprising the steps of:
deploying a probe onto the surface of the water, said probe including:
a balloon containing a gas which is lighter than air,
an envelope containing a water colorant, and
a line connecting said balloon with said envelope and also having at least P hooks connected thereto, P being an integer;
bobbing said balloon on the surface of the water in response to the taking of a single one of said hooks by fish;
releasing said colorant into the water in response to the taking of a number N of said hooks by fish, N being an integer less than P;
launching said balloon into the air while keeping said balloon tethered to said line in response to the taking by fish of a number $M > N$ of said hooks, M being an integer less than P; and
launching said balloon into the air and releasing said balloon from said line in response to the taking by fish of most of said hooks.

19. A method as in claim 18 wherein said releasing step includes the step of breaking a first portion of said line in response to force exerted on said hooks by fish, and said launching step includes the step of breaking a second portion of said line different from said first line portion in response to pressure exerted on said hooks by fish.

20. A method as in claim 18 wherein said deploying step includes:
retaining plural portions of said body together with line wound around an outer surface of said body;
applying pressure from said balloon to force said plural body portions apart;
unwinding said line from around the outer surface of said body; and
separating said body into plural portions and ejecting said plural portions under pressure of said balloon upon unwinding of a sufficient length of said line.

* * * * *